(12) United States Patent
Paulitsch et al.

(10) Patent No.: US 9,672,171 B2
(45) Date of Patent: Jun. 6, 2017

(54) ACCESS CONTROL TO A JOINTLY EXCLUSIVELY USABLE TRANSMISSION MEDIUM

(71) Applicant: EADS Deutschland GmbH, Ottobrunn (DE)

(72) Inventors: Michael Paulitsch, Ottobrunn (DE); Jan Nowotsch, Riemerling (DE)

(73) Assignee: Airbus Defence and Space GmbH (DE)

( * ) Notice: Subject to any disclaimer, the term of this patent is extended or adjusted under 35 U.S.C. 154(b) by 430 days.

(21) Appl. No.: 14/220,632

(22) Filed: Mar. 20, 2014

(65) Prior Publication Data
US 2014/0207989 A1    Jul. 24, 2014

Related U.S. Application Data

(63) Continuation of application No. PCT/EP2012/068518, filed on Sep. 20, 2012.

(30) Foreign Application Priority Data

Sep. 23, 2011 (DE) .......................... 10 2011 114 378

(51) Int. Cl.
*G06F 13/36* (2006.01)
*G06F 11/18* (2006.01)
(Continued)

(52) U.S. Cl.
CPC ............ *G06F 13/24* (2013.01); *G06F 9/5011* (2013.01); *G06F 13/364* (2013.01); *G06F 9/26* (2013.01);
(Continued)

(58) Field of Classification Search
CPC . G06F 13/36; G06F 9/26; G06F 11/18; G06F 13/00
See application file for complete search history.

(56) References Cited

U.S. PATENT DOCUMENTS 5,613,127 A * 3/1997 Schultz ............... G06F 11/1691
                                                710/260
5,740,380 A * 4/1998 LaBerge ............. G06F 13/4018
                                                710/107
(Continued)

FOREIGN PATENT DOCUMENTS

DE   102009046062 B3   4/2011
WO   2004036371 A2    4/2004
WO   2004097564 A2    11/2004

OTHER PUBLICATIONS

Bettison A et al: "LIMITS—a system for UNIX resource administration", Proceedings of the Supercomputing Conference. Reno, Nov. 13-17, 1989, New York, IEEE, US, Nov. 12, 1989, pp. 686-692, XP031577340.
(Continued)

*Primary Examiner* — Henry Tsai
*Assistant Examiner* — Christopher a Daley
(74) *Attorney, Agent, or Firm* — Lerner, David, Littenberg, Krumholz & Mentlik, LLP

(57) ABSTRACT

A computing system and a method are specified. The computing system has a plurality of components which are configured to use a resource exclusively jointly, an activity monitoring unit which records a number of activities of a component on the resource and an interrupting unit which is configured to interrupt access of the components for use of the resource when the number of activities of the component reaches an activity threshold, so that an assignment strategy can assign the exclusively jointly used resource to another component.

18 Claims, 3 Drawing Sheets

(51) Int. Cl.
  *G06F 9/26* (2006.01)
  *G06F 13/24* (2006.01)
  *G06F 9/50* (2006.01)
  *G06F 13/364* (2006.01)
  *G06F 13/00* (2006.01)

(52) U.S. Cl.
  CPC .............. *G06F 11/18* (2013.01); *G06F 13/00* (2013.01); *G06F 2209/504* (2013.01); *Y02B 60/142* (2013.01)

(56) References Cited

U.S. PATENT DOCUMENTS

| | | | | |
|---|---|---|---|---|
| 9,183,022 B2* | 11/2015 | Arges | .................. | G06F 9/45533 |
| 2002/0110084 A1 | 8/2002 | Butt et al. | | |
| 2002/0147871 A1* | 10/2002 | Koike | .................. | G06F 13/364 |
| | | | | 710/107 |
| 2003/0172220 A1* | 9/2003 | Hao | .................. | H04L 43/16 |
| | | | | 710/305 |
| 2004/0264487 A1* | 12/2004 | Benayoun | ............. | H04L 49/501 |
| | | | | 370/412 |
| 2005/0110339 A1* | 5/2005 | Kolberg | .................. | B60T 13/74 |
| | | | | 303/20 |
| 2005/0147033 A1* | 7/2005 | Chin | .................. | H04N 21/2343 |
| | | | | 370/229 |
| 2005/0182879 A1* | 8/2005 | Vu | .......................... | G06F 13/24 |
| | | | | 710/260 |
| 2009/0260006 A1* | 10/2009 | Hotra | .................... | G06F 9/5077 |
| | | | | 718/1 |
| 2010/0017551 A1* | 1/2010 | Maron | .................. | G06F 9/4881 |
| | | | | 710/107 |
| 2010/0115167 A1* | 5/2010 | Tardieux | ............... | G06F 13/362 |
| | | | | 710/240 |
| 2014/0086258 A1* | 3/2014 | Kwan | ................. | H04L 43/0876 |
| | | | | 370/412 |
| 2014/0114593 A1* | 4/2014 | Wu | .................... | G01R 31/3613 |
| | | | | 702/63 |
| 2014/0207948 A1* | 7/2014 | Lemaire | ................. | H04L 43/08 |
| | | | | 709/224 |
| 2015/0089101 A1* | 3/2015 | Tsirkin | .................... | G06F 13/24 |
| | | | | 710/262 |

OTHER PUBLICATIONS

International Search Report for Application No. PCT/EP2012/068518 dated Jan. 7, 2013.

* cited by examiner

ACCESS CONTROL TO A JOINTLY EXCLUSIVELY USABLE TRANSMISSION MEDIUM

CROSS-REFERENCE TO RELATED APPLICATIONS

The present application is a continuation of International Application No. PCT/EP 2012/068518 filed Sep. 20, 2012, published in German, which claims priority from German Patent Application No. 10 2011 114 378.9 filed Sep. 23, 2011, the disclosures of which are incorporated herein by reference.

FIELD OF THE INVENTION

The invention relates to access control of a plurality of components to an exclusively jointly used transmission medium. The invention particularly relates to a computing system having a plurality of components which use a resource exclusively jointly, an aircraft having such a computing system, a method of influencing the exclusive assignment of a jointly used resource in a computing system to a component of a plurality of components which are configured to use the resource, a computer program element for controlling a computing system and also a computer-readable medium having a computer program element of this kind.

BACKGROUND OF THE INVENTION

A network of computer elements is customarily based on an architecture according to which the individual computer elements are connected to a transmission medium, via which medium the computer elements are able to exchange data and which medium is used exclusively jointly by the computer elements. This means that each individual computer element can use the transmission medium, wherein only one computer element can use the transmission element at a given point in time. If the transmission medium is configured in such a manner that it provides a plurality of transmission channels, each transmission channel can be used by one computer element, respectively. In this case, the transmission medium with the plurality of transmission channels may be used simultaneously by a plurality of computer elements, wherein, however, a single transmission channel may be used by only one computer element at a given point in time.

It is therefore necessary for the transmission medium to be assigned via a so-called assignment strategy to a computer element in each case, which computer element can then use the transmission medium exclusively. As soon as the computer element to which the transmission medium is assigned has ended its transmission, the transmission medium is released for assignment to another computer element or to the same one.

This fundamental architecture is found in the networking or interconnection of individual computers, for example, via a computer network (so-called macrostructure) and also in the networking or interconnection of components which are located within a computer, for example on a computer processor (so-called microstructure).

Depending on the area of application, there is a plurality of assignment strategies for the assignment of the transmission medium to a computer element, wherein the structure of the assignment strategy is substantially predefined by the external requirements made of the communication performance and the communication needs of the computer elements.

DE 10 2009 046 062 B3 describes a device and a method of transmitting data via network nodes of a network, wherein a plurality of network nodes can transmit data via a data transmission bus using a transmit line and a receive line. In this case, the data transmission bus of one network node is used at one point in time and may, however, be allocated consecutively to different network nodes or assigned to these.

BRIEF SUMMARY OF THE INVENTION

There may be a need for influencing the assignment of an exclusively jointly used resource to a component of a plurality of components in any determined assignment strategy.

Many of the features described in the following in relation to the computing system can also be implemented as process steps and vice versa.

A computing system with a plurality of components which use a resource exclusively jointly is specified according to a first aspect of the invention, which computing system comprises an activity monitoring unit and an interrupting unit. The activity monitoring unit is configured to record a number of activities of a component on the resource. The interrupting unit is configured to interrupt access of the component for use of the resource when the number of activities of the component reaches an activity threshold, so that an assignment strategy can assign the exclusively jointly used resource to another component.

The activity interrupting unit may, for example, record each individual use of the resource by the components. Use of the resource may involve, for example, the transmission of a data packet via the resource.

For each component of the plurality of components, an activity threshold is specified which causes access of the corresponding component for use of the resource to be interrupted when the number of recorded activities of the component reaches this activity threshold.

As soon as access of a component to use of the resource is interrupted, the assignment strategy of the resource to a component will recognise that the resource is unused and will assign the resource to one of those components that want to use the resource.

It is thereby made possible for a component to be prevented from using the resource or for use of the resource by the component to be ended, so that the assignment strategy can assign use of the resource to another component. In particular, it is thereby made possible for the performance of any determined assignment strategy to be influenced, even if the performance and mechanisms of the assignment strategy are not known. When the number of activities of a component on the resource has reached the corresponding activity threshold, said component is prevented from using the resource and the assignment strategy is enabled to assign the resource to another component.

In other words, this means that the assignment strategy of the resource to a component is enabled to assign the resource for use by another component by preventing a component using the resource from using it. Particularly in the case of unknown performance and unknown functional principles of the assignment strategy, it is thereby made possible for assignment of the resource to the components to be undertaken based on determinist principles.

If, therefore, in the case of an arbitrarily prolonged use of the resource by a component, there is no reassignment of the resource by the assignment strategy to another component which would likewise like to use the resource, this reassignment can be enforced by preventing a component using the resource from using the resource when the number of activities of the using components reaches the activity threshold set for this component. Therefore, as soon as a using component is prevented from using the resource, the assignment strategy will assign the resource to another waiting component, even though the originally using component would have continued using the resource.

This means that the assignment of the resource to a component is indirectly affected by precluding a using component from use when the activity threshold is reached. Use of the resource is not therefore directly reassigned by influencing or changing the assignment strategy, but indirectly by interrupting use of the resource by the using component.

The activity threshold may be the same for each component of the plurality of components, but it may also be individually adapted for each component. Likewise, the activity threshold may be set before the computing system comes into operation or, however, change during the operating time of the computing system.

A component which has just been precluded from using the resource may of course immediately regain use of the resource in a following allocation cycle of the resource to a component, for example if no other component would like to use the resource. However, even in the event that a plurality of components would like to use the resource, it may be that in the following allocation cycle the assignment strategy reassigns the resource to the component which has just been precluded from using the resource. A component precluded from use may, however, also be precluded from using the resource for a number of allocation cycles.

In connection with this application, the term "allocation cycle" is understood to mean the process whereby a component which uses the resource is denied access to the resource, so that the resource is reassigned, wherein the resource is allocated by the assignment strategy.

A new cycle for allocating the resource to a component starts in each case when the using resource with the number of its activities has reached the corresponding activity threshold. The component which is allowed to use the resource in the next allocation cycle is determined by the assignment strategy. Interruption of the use of the resource by a component only enables the assignment strategy to assign the resource to another component for use, but does not force assignment to another component, since the assignment strategy takes place in the assignment of the resource in the following allocation cycle according to the internal functions and allocation mechanisms of the assignment strategy.

The computing system may, for example, be a group of a plurality of individual computers which are connected to one another for reciprocal data exchange via a network. It may, however, also be any connection of computer components which access a joint transmission medium for data exchange, for example a plurality of memories in a computer which receive or transmit data via a common data bus.

In one embodiment, the components using the resource may be particularly configured not to make enquiries in relation to the use of the resource if they are precluded from using the resource or following an interruption in use of the resource. In particular, the components precluded from using the resource may be configured not to make any enquiries as to the use of the resource until the start of a new allocation cycle.

According to one embodiment of the invention, the computing system is a multi-core processor.

According to a further embodiment of the invention, at least one component is a processor core of the multi-core processor.

The components in this case are individual processor cores, for example, of which the micro-core processor comprises a plurality. The plurality of processor cores in this case is connected via a bus system or a process-oriented bus in such a manner that the processor cores can exchange data with a memory and with input/output elements, for example.

The processor-internal bus is assigned to a processor core in each case according to a manufacturer-specific assignment strategy. In the event that the assignment of the processor-internal bus must be adapted to one of the processor cores or controlled, which may be due to the functional requirements of the area of application of the computing system, a reassignment of the bus system to one of the processor cores may be forced in that a processor core using the bus system is initially precluded from using the bus system, so that the assignment strategy can undertake a reassignment.

The multi-core processor may of course comprise any number of processor cores.

According to a further embodiment of the invention, at least one component is an input/output unit of the multi-core processor.

The input/output unit in this case is configured likewise to use the processor-internal bus system for data transmission, as a result of which these units are likewise assigned to use the bus system by the assignment strategy.

The input/output unit may be any units via which the micro-core processor performs a data exchange, i.e. data receipt and/or data despatch, with its environment.

According to a further embodiment of the invention, the activity interrupting unit has a first group of storage cells, wherein a storage cell of the first group in each case is configured to record the number of activities of one component in each case of the plurality of components.

The activity monitoring unit in this case is configured to increase a value deposited in the storage cell assigned to the respective component currently using the resource by a value of 1 in each case, for example, with each activity of the component on the resource.

The activity monitoring unit may, however, likewise comprise only a single storage cell, which is configured to record the number of activities of the component currently using the resource. With each reassignment of the resource to a component, the value of the one storage cell, which records the number of activities of the currently active component, is then reset to an initial value, for example 0.

According to a further embodiment of the invention, the activity monitoring unit comprises a second group of storage cells, wherein a storage cell of the second group in each case is configured to record the activity threshold of a component of the plurality of components in each case.

The second group of storage cells is used to compare the number of activities of the using component with the permitted activity threshold. Only when the number of activities of the component using the resource has reached that activity threshold is the component precluded from using the resource.

In the event that all components have the same activity threshold, the second group may also comprise a single storage cell which contains the joint activity threshold of all components.

The activity monitoring unit may therefore comprise a first storage cell, for example, for the number of activities of the using component and a second storage cell for the activity threshold of all components, wherein the first storage cell in each allocation cycle is reset to an initial value and a second resource allocation cycle is initiated when the number of activities of the using component reaches the activity threshold.

According to a further aspect of the invention, an aircraft is provided with a computing system as specified above and described in the following, wherein the computing system is configured to perform deterministically executable functions.

In particular, the computing system may be configured in the aircraft to perform a plurality of operations such as, for example, the transmission of sensor signals, control information, multimedia information and further arbitrary data to be transmitted via a transmission medium.

Each of these computing operations may be carried out on a component of the computing system in this case, but a plurality of computing operations may also be carried out on a component. In this case, an activation threshold may be assigned to an individual component, but also to each computing operation.

Particularly when used in aircraft or in other safety-critical environments, it may be necessary to have available an exclusively jointly used resource, such as a network connection or a data transmission bus, for example, for reassignment to a component using the resource after a defined number of actions. By interrupting the component's use of the resource, it is made possible for the assignment strategy or the assignment strategy is forced to reassign the resource.

It is therefore possible to foresee the number of activities after which the jointly used resource will be available for reassignment, so that an arbitrary assignment strategy can be used and deterministic processing of the computing operations on the individual components is still made possible.

Particularly when using commercially available multi-core processors, the user of a multi-core processor of this kind is not free to decide on the assignment of the processor-internal bus system to a processor core or else to influence the assignment strategy of the bus system, so that by means of the device or computing system described above and in the following, a deterministic assignment of the processor-internal bus system to the processor cores can be facilitated on a commercially available processor with an unknown assignment strategy.

According to a further aspect of the invention, a method of influencing the exclusive assignment of a jointly used resource in a computing system to a component of a plurality of components or a computing operation, which are configured to use a resource, is provided, wherein the assignment of the resource to the component or the computing operation takes place according to any determined assignment strategy. The method comprises the following steps in this case: determining of an activity threshold which indicates the maximum number of activities of the component or the computing operation on the jointly used resource, monitoring of a number of activities of the component or the computing operation on the jointly used resource, blocking of access of the component or computing operation to the jointly used resource, if the number of activities has reached the determined activity threshold, so that the assignment strategy can assign the jointly used resource to another component or another computing operation.

The embodiments of the method for the component portrayed above and in the following also apply similarly to a computing operation. A computing operation in this case may, for example, be understood to mean a process or a block of statements to be handled on a computer.

The blocking of access of the component to the jointly used resource may, for example, take place in that an interrupt signal is transmitted from the monitoring unit to an operating system when the activity threshold is reached and the operating system stops execution of a computing operation on the component, for example a processor core of a multicore processor or a computing operation on a processor core, as a result of which a bus system is no longer used by the corresponding processor core and becomes available for renewed assignment.

According to an embodiment of the invention, the activity threshold for each component is determined at a constant value.

The activity threshold in this case may be the same for each component or it may also assume a different, individually set value for each component.

The activity threshold for the components is set in this case by an operating time of a computing system, for example, and remains the same over the entire operating time.

According to a further embodiment of the invention, the activity threshold for each component is determined according to fluctuating external parameters, wherein the activity threshold can vary during implementation of the process.

This means, for example when using the method in a computing system in an aircraft, that the activity thresholds for each component can be varied for each component depending on a flight phase, for example, such as take-off, cruising phase or landing, for example, and also other external factors such as weather conditions, for example. It goes without saying that the activity threshold can be varied automatically or by manual input.

According to a further embodiment of the invention, access of the component to the jointly used resource is blocked by transmitting an interrupt signal to an operating system, wherein the operating system blocks access to the jointly used resource when the interrupt signal is received for the component or a computing operation.

The operating system may be configured in this case to control computing operations on the components. According to this, the operating system is also capable of interrupting and continuing the processing of a computing operation on a component, for example a processor core of a multicore processor, according to the allocation of the bus system to one of the processor cores.

According to a further embodiment of the invention, the method comprises the following step as described above and in the following: removal of the access blockade of the component to the jointly used resource, wherein removal of the blockade takes place after access to the jointly used resource has been withdrawn from the component.

Removal of the blockade may take place, for example, in that the number of activities of the blocked component is reset to the initial value, so that the component can be taken into account again in a following allocation cycle of the resource during assignment.

The blockade to a component using the resource may of course also be lifted only after a determined number of allocation cycles. This ensures that a component is not used in a plurality of consecutive allocation cycles.

The method does not therefore mean, as described above and in the following, that the allocation sequence of a jointly used resource to the components is determined, but the method simply allows an assignment strategy to reassign the resource by interrupting the currently using component. In particular, the decision as to which component receives the resource can then rest with the assignment strategy in the next allocation cycle.

According to a further aspect of the invention, a computer program element for controlling a computing system as described above and in the following is indicated, which is configured to implement the method as described above and in the following, when the computer program element is executed on a processor of the computing unit.

In particular, the computer program element is configured to be executed on a multi-core processor of a computing unit. When executed on a multi-core processor, the computer program element enables the assignment of a processor-oriented bus system to the processor cores of the micro-core processor to be influenced.

According to a further aspect of the invention, a computer-readable medium is provided, on which a computer program element as described above and in the following is stored.

A computer-readable medium in this case may be each volatile or non-volatile storage medium, for example a hard disk, a CD, a DVD, a diskette, a memory card or any other computer-readable medium or storage medium.

Exemplary embodiments of the invention are described in the following with reference to the figures.

DETAILED DESCRIPTION

The depictions in the figures are schematic and not to scale.

If the same reference numbers are used in the following description of the figures, these relate to the same or similar elements.

Figure 1:
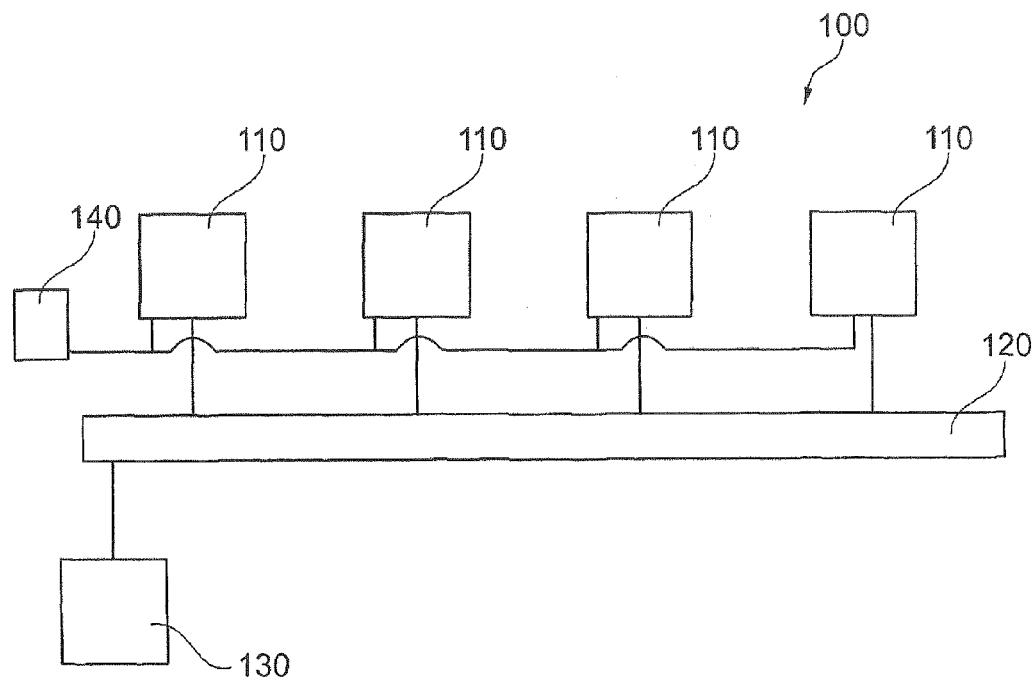
FIG. 1 shows a computing system according to an exemplary embodiment of the invention.

FIG. 1 shows a computing system 100 with four components 110, for example computers, which are able to transmit and receive data via a joint resource 120, for example a bus system or a network connection. Furthermore, the computing system 100 comprises an activity monitoring unit 130 and an interrupting unit 140.

The activity monitoring unit 130 is configured to record the number of activities of the components 110 on the joint transmission medium 120. The recorded number of activities of a component 110 is compared with an activity threshold and in the event that the number of activities corresponds to the activity threshold, the component 110 which uses the transmission medium 120 is precluded from using the bus system 120 by means of the interrupting unit 140 or else access of the using component 110 to the transmission medium 120 is interrupted.

Figure 2:
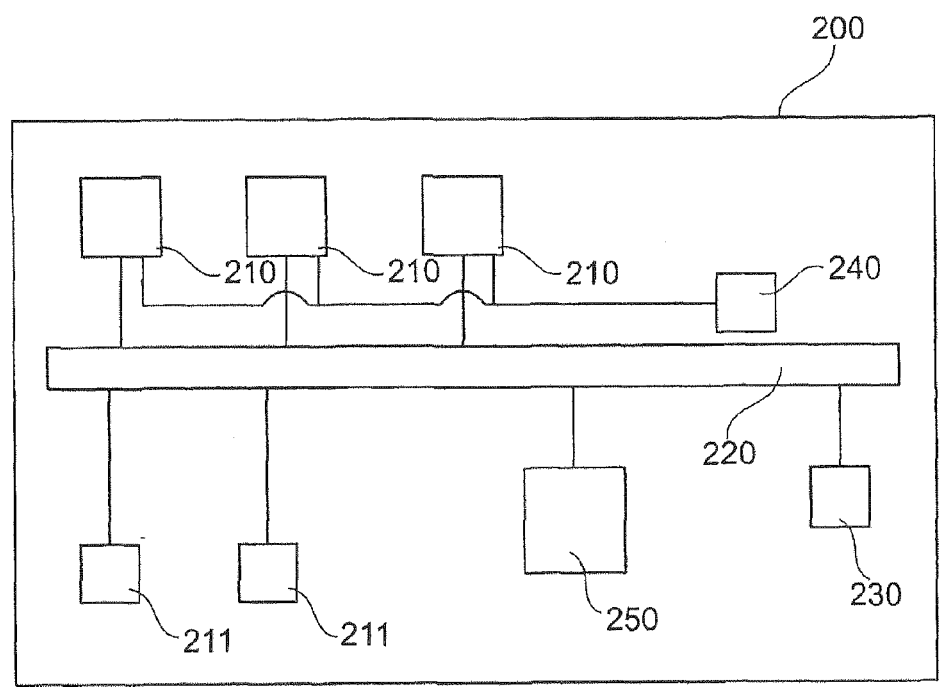
FIG. 2 shows a multicore processor according to an exemplary embodiment of the invention.

FIG. 2 shows a multi-core processor 200 with three processor cores 210, two input/output units 211 and a memory 250, which are connected to one another via a jointly usable processor-internal bus 220, such that a reading and writing data exchange between the aforementioned elements can take place. An activity monitoring unit 230, for example a so-called debug unit, monitors the activity of the processor cores or the input/output units on the processor-internal bus system 220 and records the number of activities of the unit which is currently using the bus system 220.

In addition, the multicore processor 200 contains an interrupting unit 240 which is configured to interrupt access of a component, i.e. a processor core 210, to the bus system 220.

Even if the interrupting unit 240 is configured according to FIG. 2, only to interrupt access of the processor cores to the bus system 220, the interrupting unit may also be configured to interrupt access of the input/output units 211 to the bus system.

The interrupting unit 240 may also be an interrupt function of an operating system, for example, which runs on the multicore processor 200.

Figure 3:
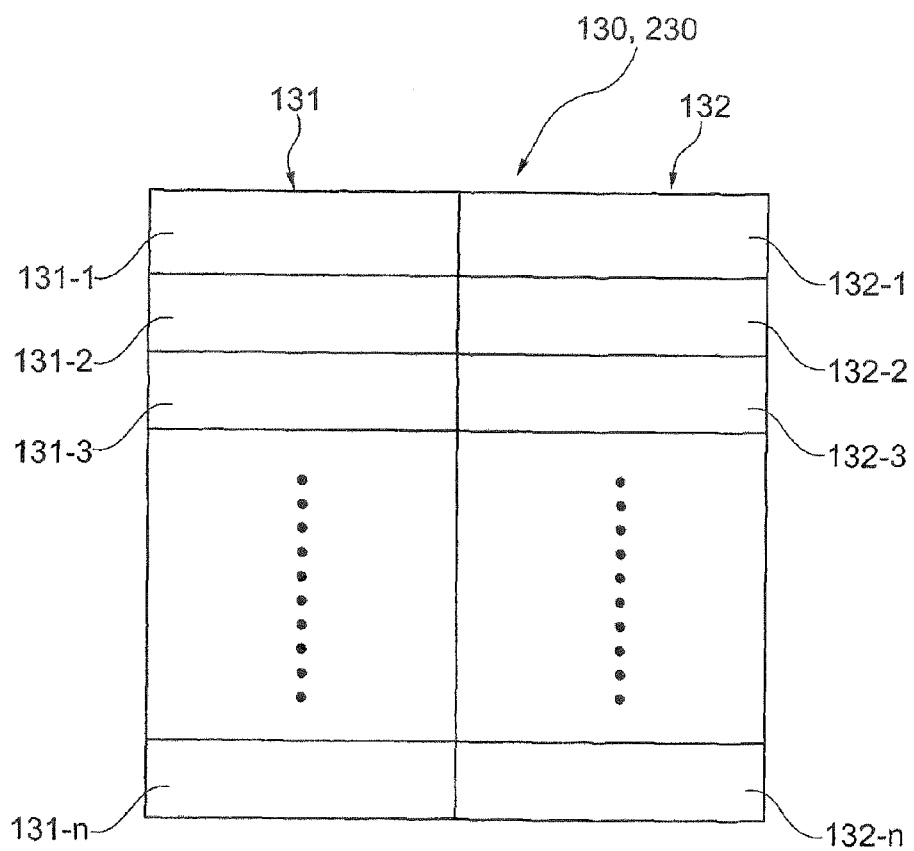
FIG. 3 shows an activity monitoring unit for a computing system according to an exemplary embodiment of the invention.

FIG. 3 shows an activity monitoring unit 130, 230 with a first group of storage cells 131 and a second group of storage cells 132. The first group of storage cells 131 comprises a plurality of storage cells, wherein each individual storage cell of the first group is configured to record the number of activities of one component of the plurality of components in each case, i.e. the activities of the computer, the processor cores or the input/output units. Furthermore, one storage cell of the second group of storage cells in each case is configured to contain an activity threshold for each of the aforementioned components.

The first group of storage cells 131 contains a first storage cell 131-1, which records the number of activities of a first component. In addition, further storage cells are configured in the first group of storage cells, which can likewise record a value for the number of activities of a further component. In this case, the storage cells 131-2, 131-3 up to 131-$n$ are each assigned to a component 110, 210, 211.

Similarly, the same embodiments apply to the storage cells 132-1, 132-2, 132-3 up to 132-$n$, which are each configured to record an activity threshold for a component 110, 210, 211 in each case.

As can be seen from the schematic representation in FIG. 3, both the number of components 110, 210, 211 and also the number of storage cells of the first group and the second group can be determined at any number.

The first group of storage cells 131 may likewise be configured such that this group comprises only one storage cell 131-1, which storage cell 131-1 then records the number of activities of the component which uses the transmission medium 120, 220 in each case. In addition, the second group of storage cells 132 may be configured such that each component nevertheless contains its own activity threshold, i.e. that each component 110, 210, 211 can have its own adjustable activity threshold.

Figure 4:
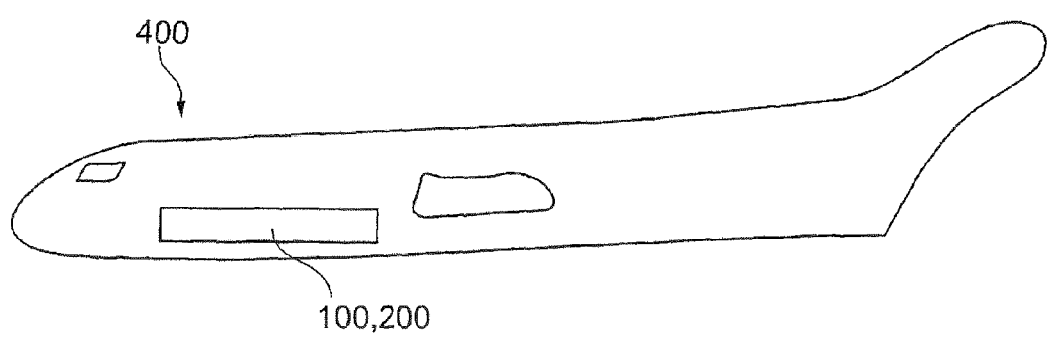
FIG. 4 shows an aircraft with a computing system according to an exemplary embodiment of the invention.

FIG. 4 shows an aircraft 400 with a computing system 100, 200, wherein the computing system is configured to carry out deterministically executed functions in the aircraft.

Functions to be executed deterministically may particularly involve the transmission of sensor signals and control signals in the aircraft; however, multimedia signals, for example, may also be transmitted by the computer system, for example.

Figure 5:
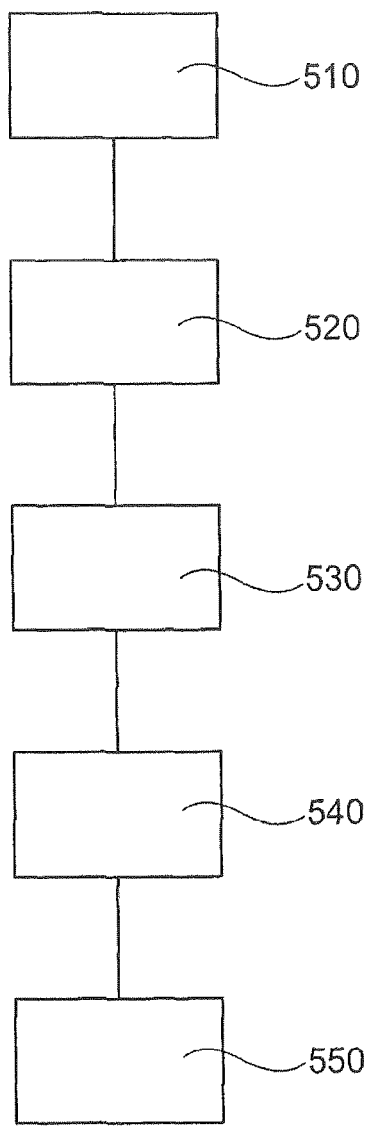
FIG. 5 shows a schematic flow diagram of a method according to an exemplary embodiment of the invention.

FIG. 5 shows the schematic reproduction of a method for influencing the exclusive assignment of a jointly used resource in a computing system to a component of a plurality of components which are configured to use the resource, in which case the assignment of the resource to the component takes place according to an arbitrary determined assignment strategy.

In a first step 510 an activity threshold is determined, which indicates the maximum number of activities of the component on the jointly used resource.

In a second step 520, a number of activities of the component on the jointly used resource are monitored.

In a third step 530, the activity threshold is adapted while the method is implemented, i.e. during an operating time of a computing system, for example, on which the method is implemented as described above and in the following.

In a fourth step 540 the blocking of access of the component to the jointly used resource takes place when the number of activities has reached the determined activity threshold, so that the approval strategy can assign the jointly used resource to another component. The jointly used resource can of course be reassigned to the component which used the resource in the last allocation cycle.

In a fifth step 550, removal of the access blockade of the component to the jointly used resource takes place.

The removal of the access blockade can therefore start both before the next assignment cycle begins, i.e. the recently using component can receive the resource again, and also only after the start of the next allocation cycle, so that the recently using component cannot receive the resource in the next allocation cycle.

The removal of the access blockade of the component to the resource may likewise only take place after a determined number of allocation cycles.

Figure 6:
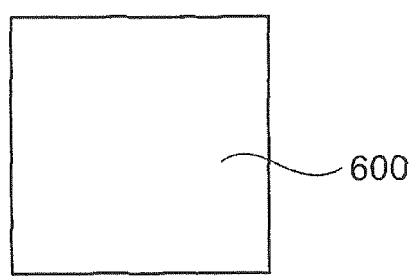
FIG. 6 shows a computer-readable medium according to an exemplary embodiment of the invention.

FIG. 6 shows a computer-readable medium 600, on which a computer program element for controlling a computing system as described above and in the following is stored, which computer program element is configured to implement the method as described above and in the following, if it is executed on a processor of a computing unit.

It should be pointed out in addition that "comprising" does not preclude any other elements or steps and one or "a" does not preclude a plurality. In addition, it should be pointed out that features or steps which have been described with reference to one of the above exemplary embodiments can also be used in combination with other features or steps of other exemplary embodiments described above. Reference numbers in the claims should not be regarded as a limitation.

The invention claimed is:

1. A computing system having a plurality of components which use a resource exclusively jointly, wherein each component is configured to use the resource and at one given point of time only one component can use the resource, the computing system comprising:
an activity monitoring unit configured to record a number of activities of a component on the resource; and
an interrupting unit configured to interrupt access of the component for use of the resource when the number of activities of the component recorded by the activity monitoring unit reaches an activity threshold, so that an assignment strategy can reassign the exclusively jointly used resource to any one of requesting components,
wherein the requesting components include the component which was interrupted by the interrupting unit and remaining components of the plurality of components, each of the plurality of components having an individually adapted activity threshold, and
wherein the interrupting unit is configured to indirectly affect assignment of the resource to a component by the assignment strategy as a result of interrupting the component which is currently using the resource.

2. The computing system according to claim 1, wherein the computing system is a multi-core processor.

3. The computing system according to claim 2, wherein at least one component is a processor core of the multi-core processor.

4. The computing system according to claim 2, wherein at least one component is an input/output unit of the multi-core processor.

5. The computing system according to claim 1, wherein the activity monitoring unit has a first group of storage cells, and
wherein each storage cell of the first group is configured to record the number of activities of one component of the plurality of components, respectively.

6. The computing system according to claim 1, wherein the activity monitoring unit comprises a second group of storage cells, and
wherein each storage cell of the second group is configured to store the activity threshold of a component of the plurality of components, respectively.

7. An aircraft with a computing system, the computing system having a plurality of components which use a resource exclusively jointly, wherein each of the plurality of components is configured to use the resource and wherein at one given point of time only one of the plurality of components can use the resource, the computing system comprising:
an activity monitoring unit configured to record a number of activities of a component on the resource;
an interrupting unit configured to interrupt access of the component for use of the resource when the number of activities of the component recorded by the activity monitoring unit reaches an activity threshold, so that an assignment strategy can reassign the exclusively jointly used resource to any one of requesting components,
wherein the computing system is configured to perform deterministically executable functions,
wherein the requesting components include the component which was interrupted by the interrupting unit and remaining components of the plurality of the components, each of the plurality of components having an individually adapted activity threshold, and
wherein the interrupting unit is configured to indirectly affect assignment of the resource to a component by the assignment strategy as a result of interrupting the component which is currently using the resource.

8. A method of influencing the exclusive assignment of a jointly used resource in a computing system to a component of a plurality of components or to a computing operation which is configured to use the resource, wherein at one given point of time only one of the plurality of components or only one computing operation can use the resource, wherein the assignment of the resource to the component or the computing operation takes place according to any determined assignment strategy;

the method comprising:
- determining an activity threshold which indicates the maximum number of activities of the component or the computing operation on the jointly used resource;
- monitoring a number of activities of the component or the computing operation on the jointly used resource; and
- blocking access of the component or computing operation to the jointly used resource, if the monitored number of activities has reached the determined activity threshold, so that the assignment strategy can reassign the jointly used resource to any one of requesting components or any one of requesting computing operations,
- wherein the requesting components include the component which was interrupted by the interrupting unit and remaining components of the plurality of the components, each of the plurality of components having an individually adapted activity threshold, and
- wherein the interrupting unit is configured to indirectly affect assignment of the resource to a component by the assignment strategy as a result of interrupting the component which is currently using the resource.

9. The method according to claim 8, wherein the activity threshold for each component or for each computing operation is determined at a constant value.

10. The method according to claim 8, wherein the activity threshold for each component or for each computing operation is determined according to fluctuating external parameters; and
- wherein the activity threshold during performance of the method is varied according to fluctuating external parameters.

11. The method according to claim 8, wherein access of the component or computing operation to the jointly used resource is blocked by transmitting an interrupt signal to an operating system; and
- wherein the operating system blocks access of the component to the jointly used resource when the interrupt signal is received for the component or computing operation.

12. The method according to claim 8, further comprising the step:
- removal of the access blockade of the component or the computing operation to the jointly used resource;
- wherein removal of the blockade takes place once access to the jointly used resource has been withdrawn from the component or computing operation.

13. A non-transitory computer-readable medium on which a computer program element for controlling a computing system having a plurality of components which use a resource exclusively jointly is stored, wherein each of the plurality of components is configured to use the resource and wherein at one given point of time only one component can use the resource, the computer program element configured to implement a method when executed on a processor of a computer unit, the method comprising:
- determining an activity threshold which indicates the maximum number of activities of the component or a computing operation on the jointly used resource;
- monitoring a number of activities of the component or the computing operation on the jointly used resource; and
- blocking access of the component or computing operation to the jointly used resource, if the monitored number of activities has reached the determined activity threshold, so that the assignment strategy can reassign the jointly used resource to any one of requesting components or any one of requesting computing operations,
- wherein the requesting components include the component which was interrupted by the interrupting unit and remaining components of the plurality of the components, each of the plurality of components having an individually adapted activity threshold, and
- wherein the interrupting unit is configured to indirectly affect assignment of the resource to a component by the assignment strategy as a result of interrupting the component which is currently using the resource.

14. The computing system of claim 1, wherein the activity is transmission of a data packet and the activity threshold is a given number of data packets.

15. The aircraft of claim 7, wherein the activity is transmission of a data packet and the activity threshold is a given number of data packets.

16. The method of claim 8, wherein the activity is transmission of a data packet and the activity threshold is a given number of data packets.

17. The non-transitory computer-readable medium of claim 13, wherein the activity is transmission of a data packet and the activity threshold is a given number of data packets.

18. The computing system of claim 1, wherein each of the plurality of components has same activity threshold.

* * * * *